E. HEYMANN.
AUTOMOBILE WHEEL.
APPLICATION FILED APR. 26, 1917.

1,319,957.

Patented Oct. 28, 1919.
2 SHEETS—SHEET 1.

INVENTOR.
Enrique Heymann
BY
B. Smger
ATTORNEYS.

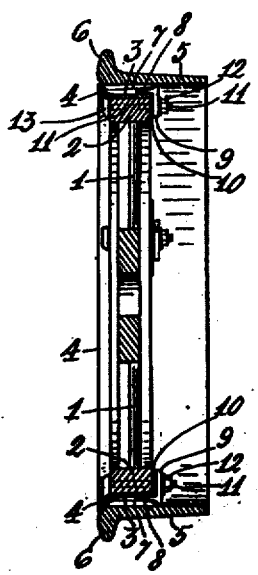
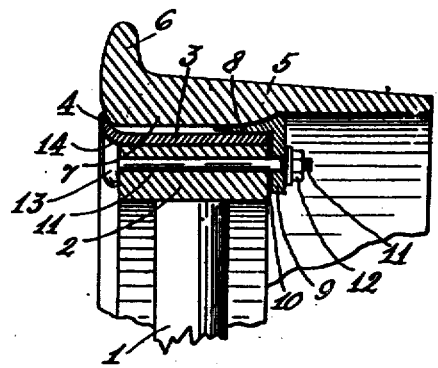
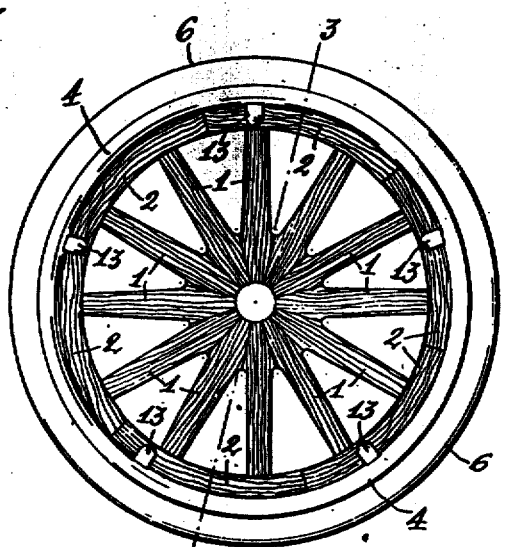

UNITED STATES PATENT OFFICE.

ENRIQUE HEYMANN, OF HABANA, CUBA.

AUTOMOBILE-WHEEL.

1,319,957. Specification of Letters Patent. Patented Oct. 28, 1919.

Application filed April 26, 1917. Serial No. 164,742.

*To all whom it may concern:*

Be it known that I, ENRIQUE HEYMANN, citizen of the Republic of Cuba, residing at Habana, Republic of Cuba, have invented new and useful Improvements in Automobile-Wheels, of which the following is a specification.

This invention relates to automobile wheels and its object is to provide an improvement in the construction of said wheels, with a view to adapting the automobile for riding upon the rails of street railways or the usual railroad tracks, so that by providing an automobile with two sets of demountable rims, one of them adapted to be used in connection with pneumatic tires and the other, although not necessitating any change in the rim construction, being capable of engaging rails, the automobile provided with these two sets will be enabled to traverse both highways and run upon railroad tracks.

In connection with the drawings:

Fig. 2 is a side elevation taken from the opposite side.

Fig. 3 is a section taken along line 3—3 of Fig. 2.

Fig. 4 is an enlarged detail of my method of mounting the rail tire upon the rim.

Figure 5:
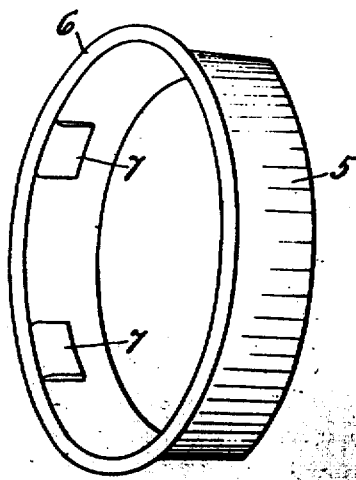
Fig. 5 is a perspective view of said rail tire.
Figure 1:
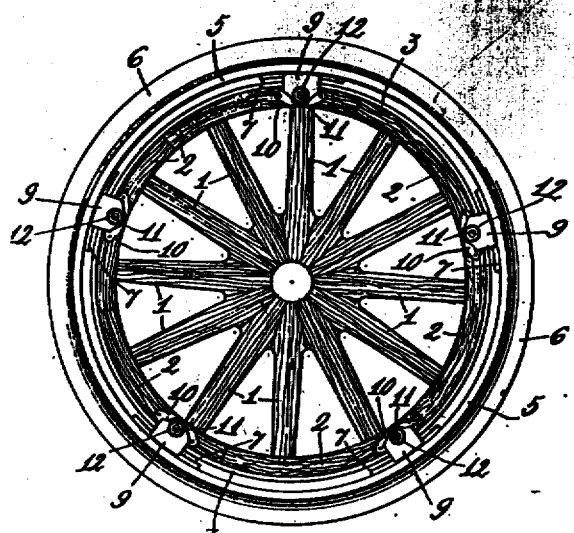
Figure 1 is a side elevation of the wheel constructed according to this invention.

Referring more particularly to the drawings, it will be seen that in a wheel constructed in accordance with the present invention, conventional spokes 1 are provided which support the felly 2 upon which is secured the usual demountable rim 3 provided with an upwardly extending flange 4, this flange being arranged as is usual, around the inner face of the wheel so that the movable wedges 8 may be readily accessible. The usual pneumatic tire is removed from the rim 3 and a rail tire 5 is adapted to be mounted upon the demountable rim 3 in place of the usual pneumatic tire, said rail tire 5 being formed with an upwardly extending flange 6, adapted to engage the rail. It will be noted that the rail tire is of substantially twice the width of the rim 3 and that the thickness of said tire decreases toward the edge opposite to the upturned flange 6, so that the outer periphery of the wheel may have a tapered form. By this construction it is possible to obtain as large a traction surface as possible for the tire, and the tapered form of the outer periphery of the tire 5 offers a relatively small contacting surface between the tire and the rail, which is relatively small as compared with the area of the periphery of the tire 5, whereby the friction between the wheel and the rail is greatly reduced.

The tire 5, as aforestated, is disposed upon the rim 3 and abuts against the flange 4. It will be noted that I have provided the tire with raised surfaces 7 upon its inner face. In positioning my tire upon the rim I permit the portions 7 to come directly over the wedges 8 thereby providing that the portions of the tire subjected to the greatest stress are provided with the greatest strength. The wedges 8 are provided with a right angle extension 9 adapted to overlap the felly 2 upon one of its sides. The outer surface of the rim 3 at the flange 4 is made convex as indicated at 14 and a bolt 11 is provided, formed with a head 13, having one of its edges made concave so as to lie snugly against the outer surface of the rim 3 at 14.

The bolt 11 is screw threaded at its opposite end and after a washer 10 has been interposed between the side of the felly 2 and the right angle extension 9 of the wedge 8, a nut 12 is adapted to be applied to said threaded portion and upon tightening, to bolt the wedge 8, inwardly, thus firmly engaging the portions 7 of the tire 5 and preventing any movement of this wheel with respect to the rim. It will be further noticed that upon this operation taking place, the tire 5 will bear very strongly against the upturned flange 4 and this might take place to such an extent as to make it possible that this flange might bend downwardly and allow the tire 5 to slip beyond. This danger is eliminated by making the bolt head 13 concave on its upper surface so that the same may serve as an additional brace for the flange 4.

Having thus described my invention, what I claim is:—

1. A wheel including a felly, a rim secured thereon and formed with an upwardly extended flange along its inner edge, a rail tapered flanged tire mounted on said rim against the flange thereof and extending from the outer side of the wheel, a plurality of wedge-shaped members directly interposed between the tapered tire and rim at the outer edge of the latter, each wedge-shaped member being provided with a right angle extension below said rim, a plurality of bolts passing through registering openings in the felly and in the extensions of the wedge-shaped members, and a plurality of nuts adapted to engage the screw threaded ends of the bolts.

2. A wheel including a felly, a rim secured thereon and formed with an upwardly extended flange along its inner edge, a rail flanged tire of tapered outer periphery which is mounted on said rim and is of such width as to project outwardly therefrom a distance substantially equal to the width of the wheel, a plurality of wedge-shaped members directly interposed between the tapered tire and rim, each wedge-shaped member being provided with a right angle extension below said rim, a plurality of bolts passing through registering openings in the felly and in the extensions of the wedge-shaped members, each bolt being provided at its inner edge with a head having a curved face to engage the flange of the rim, and a plurality of nuts to engage the screw threaded ends of the bolts.

3. In an automobile wheel, a felly, a demountable rim on the felly and having an outstanding flange at one side, a track rim on the demountable rim, bearing against the flange thereof and having a flange on its inner side on the side opposite said demountable rim flange, a wedge-shaped fastening member arranged between the demountable rim and said flange of the track rim and provided with an extension bearing against one side of the felly, and a bolt extending through the felly and having a head bearing against the flange of the demountable rim and also having a nut bearing against the extension of said fastening member, so that said fastening member and said bolt detachably secure both the demountable rim and the track rim and permit the latter to be removed independently of the demountable rim.

In testimony whereof I have signed my name to this specification.

ENRIQUE HEYMANN.